(12) United States Patent
Okuyama et al.

(10) Patent No.: US 7,692,846 B2
(45) Date of Patent: Apr. 6, 2010

(54) IMAGE DISPLAY DEVICE

(75) Inventors: Okushi Okuyama, Tokyo (JP); Eiichi Sakai, Kanagawa (JP); Shigeki Takenouchi, Tokyo (JP); Tatsuya Nagase, Tokyo (JP); Yukio Hosoya, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/205,468

(22) Filed: Sep. 5, 2008

(65) Prior Publication Data

US 2009/0086308 A1    Apr. 2, 2009

(30) Foreign Application Priority Data

Sep. 28, 2007    (JP)    ............................. 2007-253699

(51) Int. Cl.
 *G02B 26/00*    (2006.01)

(52) U.S. Cl. ...................................... 359/296; 359/245
(58) Field of Classification Search .................. 359/296
See application file for complete search history.

(56) References Cited

U.S. PATENT DOCUMENTS

2003/0099027 A1*   5/2003   Shigehiro et al. ........... 359/296

FOREIGN PATENT DOCUMENTS

JP    2003248247    9/2003

* cited by examiner

*Primary Examiner*—Jordan M. Schwartz
*Assistant Examiner*—James C Jones
(74) *Attorney, Agent, or Firm*—Lucas & Mercanti, LLP

(57) ABSTRACT

Disclosed is an image display device comprising: (i) a pair of substrates facing each other, provided that one of the substrates is transparent; and (ii) charged particles placed in a gap between the substrates, wherein each of the substrates has a layer containing a compound having a silicone structure in the molecule on a surface of the substrates faced with another electrode.

11 Claims, 4 Drawing Sheets

FIG. 2 (a) BEFORE APPLICATION OF VOLTAGE
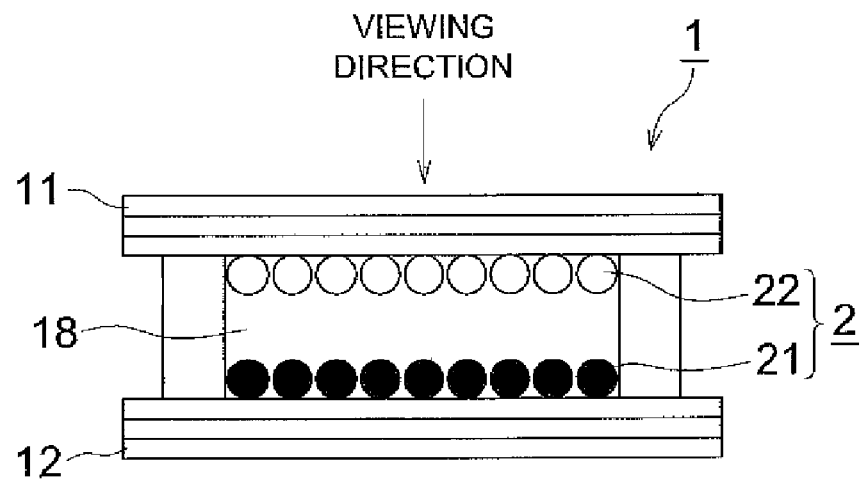
FIG. 2 (b) AFTER APPLICATION OF VOLTAGE
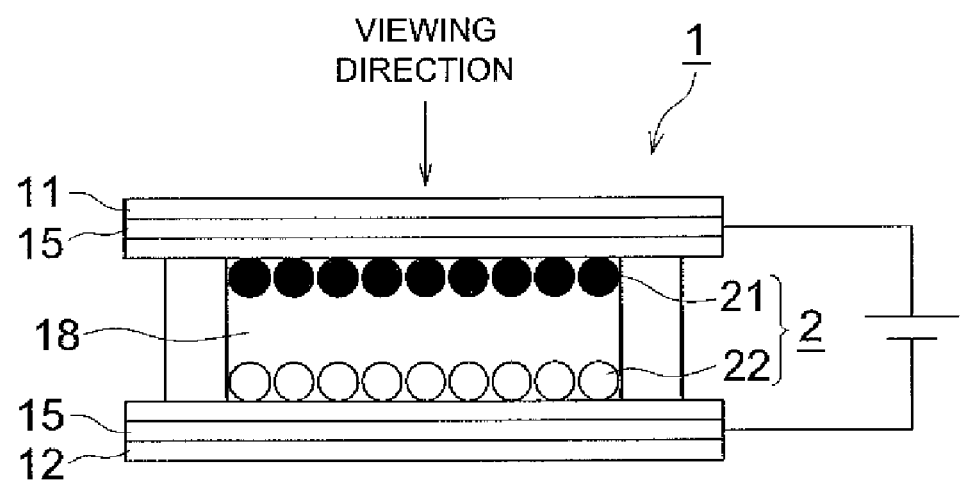

FIG. 3 (a) BEFORE APPLICATION OF VOLTAGE (SWITCH OFF)
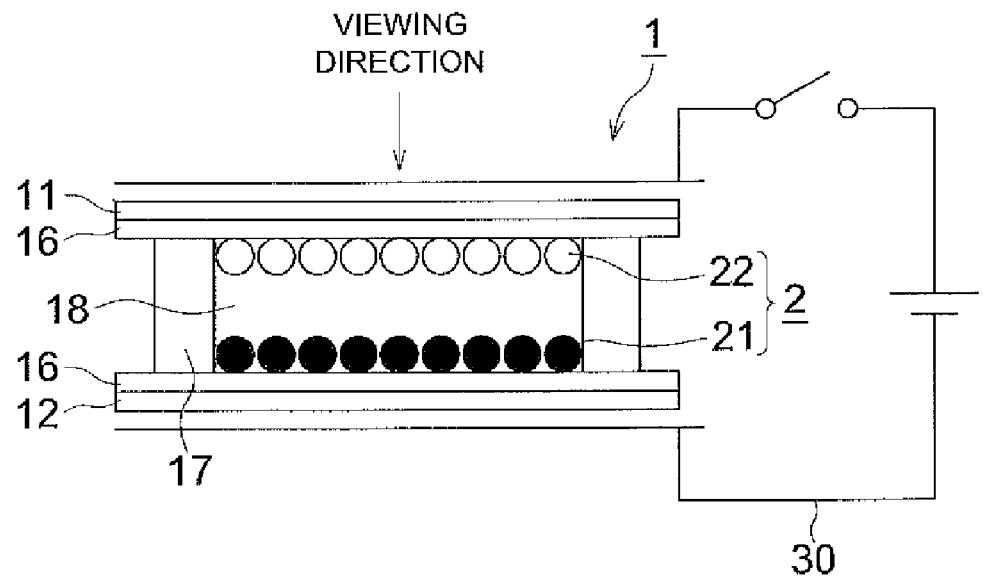
FIG. 3 (b) AFTER APPLICATION OF VOLTAGE (SWITCH ON)
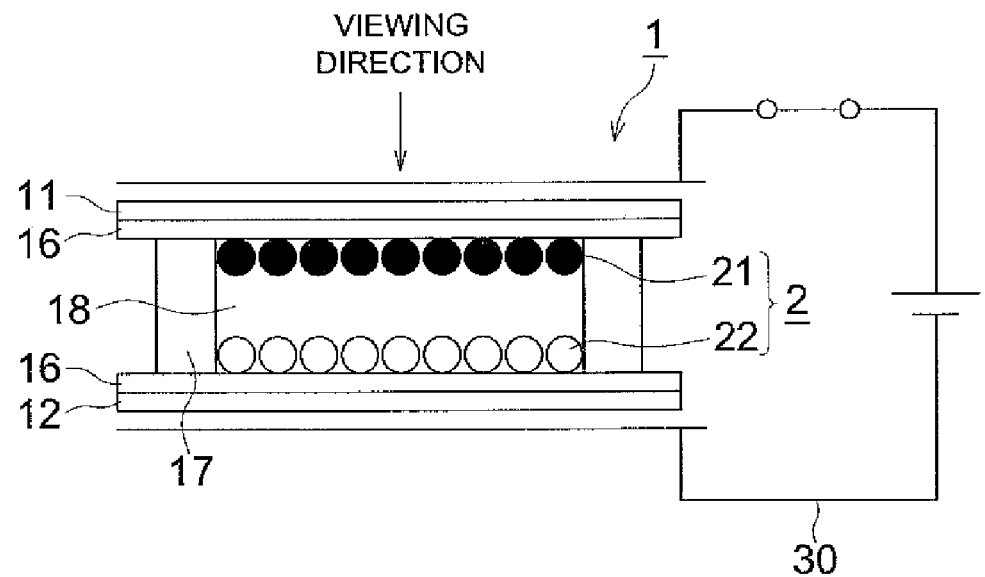

FIG. 4
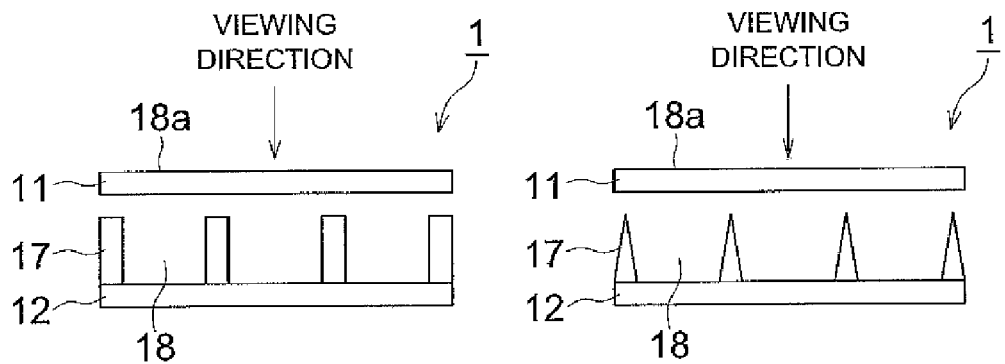
IMAGE DISPLAY SURFACE
(SUBSTRATE 11 VIEWED FROM VIEWING DIRECTION)
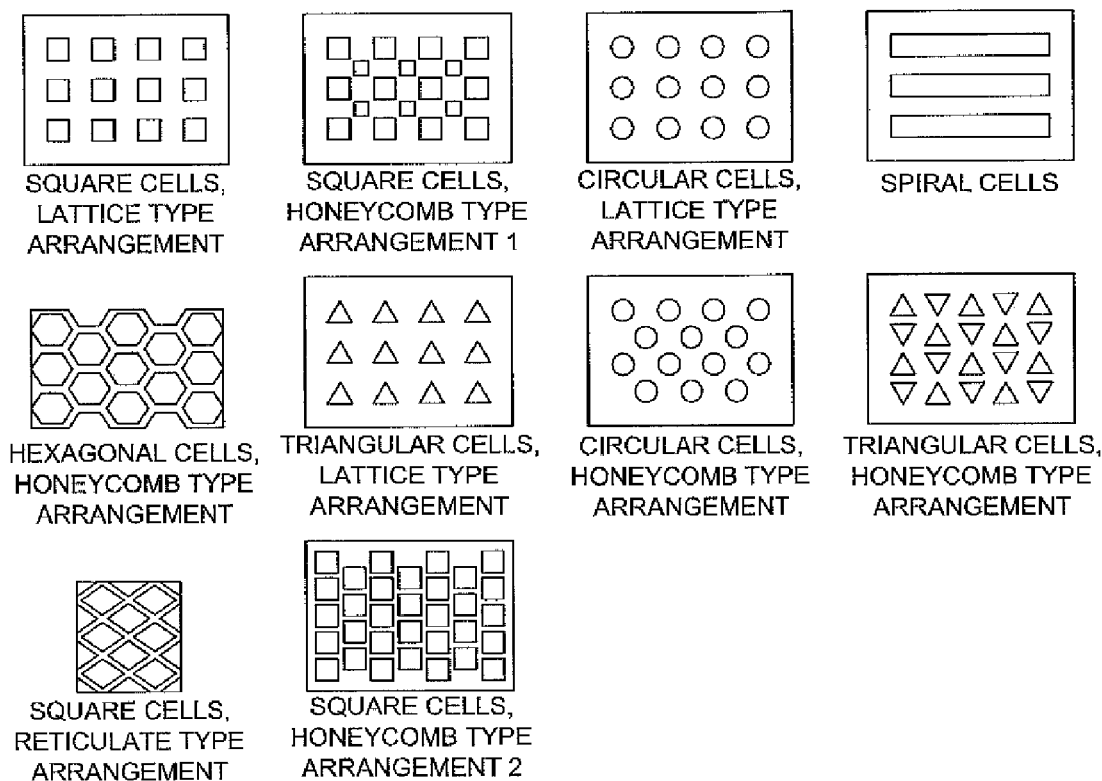

IMAGE DISPLAY DEVICE

CROSS-REFERENCE TO RELATED APPLICATION

The present application is based on Japanese Patent Application No. 2007-253699 filed with Japan Patent Office on Sep. 28, 2007, the entire content of which is hereby incorporated by reference.

BACKGROUND OF THE INVENTION

1. Technical Field

The present invention relates to an image display device wherein images are repeatedly displayed and deleted by allowing charged particles to migrate in an electric field.

2. Description of Related Art

Heretofore, as a display device substitutable for a liquid crystal display (LCD), new display devices employing technologies such as an electrophoretic method, an electrochromic method, a thermal method, and a dichroic-particles-rotary method have been proposed. Since these technologies have the advantages described below, the applications thereof to the next generation image display devices, such as a display element for use as a personal digital assistance, or an electronic paper, have received attention. That is, the advantages include: excellent image quality close to regular printed matter since a wider viewing angle can be attained compared to a liquid crystal display, lower electrical power consumption, and the so-called "memory performance", which is a characteristic of preserving images after the power is off.

Of these technologies, the image display technology employing the electrophoretic method is such that image display is achieved by disposing a solution comprising dispersed particles in a colored solution between a pair of substrates facing each other, followed by applying voltage of about several tens of volts between the substrates, to result in migration of particles in the liquid phase. As an image display technology employing the electrophoretic method, there have been proposed technologies such that a dispersed solution is contained in microcapsules, which are then disposed between a pair of substrates facing each other (for example, refer to Non-Patent Document 1). This technology is considered to be the most feasible for a practical application. However, it has the problem that maintaining a displayed image circumstances is hard to realize.

Specifically, the problem is the difference in the specific gravity between a colored solution and dispersed particles, that is, when the difference in specific gravity between them becomes excessive, the dispersed particles tend to sediment in the colored solution, resulting in a problem of achieving stable image display. For example, when dispersed particles of a high specific gravity, such as titanium oxide, are used in a colored solution of a low specific gravity, the dispersed particles sediment in the colored solution. Further, the colored solution is usually prepared using dyes which are considered to have drawbacks in preservation properties, so that within one aspect of this technology, it is difficult to maintain a constant level of quality of the displayed image.

On the other hand, an image display technology without use of solutions has been proposed. For example, there exists an image display technology in which charged particles are enclosed in a gas phase, and, by applying voltage, the aforesaid particles are allowed to migrate along a direction of an electric field. Although the aforesaid method had no problem such as sedimentation of particles or inferior preservation properties of colored solution, the aforesaid particles were required to be charged by applying voltage between substrates, and moreover, the charged particles were required to migrate along a direction of an electric field which was formed by the applied voltage. In other words, a technology has been desired which creates such a circumstance between substrates that, even under low applied voltage, particles can be smoothly charged and enabled to migrate. In order to respond to the demands, the so-called driving voltage reducing technology was studied, whereby particles are charged and allowed to migrate under low applied voltage, and then, a technology trying to achieve the reduced driving voltage by coating a fluororesin on the surfaces of substrates with which particles come into contact was studied (for example, refer to Patent Document 1).

However, when an image was displayed, charged particles easily attached to the surface of the above-described substrate whose surface was coated by a fluororesin, and to remove the attached particles, high voltage was required to be applied between the substrates. Further, once the substrate surface was attached by the aforesaid particles, displayed image density decreased and image contrast was lowered, to result in deteriorated image quality. As such, the image display device, whose substrate surface was coated with fluororesin, was hard to perform a stable image display under low applied voltage, and in particular, the device showed a tendency for migration of particles between substrates which became increasingly difficult during repeating use.

Patent Document 1: Japanese Unexamined Patent Application Publication No 2003-248247

Non-Patent Document 1: Gugrae-Jo, et al., "New Toner Display Device (I)", The Annual Conference of the Imaging Society of Japan, Jul. 21, 1999, "Japan Hard Copy '99", pp. 249-252

SUMMARY

In an image display device wherein an image is displayed by enclosing charged particles in a gas phase and the particles migrate due to application of voltage, it is an object of the present invention to provide an image display device wherein charged particles do not attach to substrates when an image is displayed, to result in no degradation in image qualities. It is a further object of the present invention to provide an image display device wherein particles smoothly migrate under low applied voltage, to result in a stable image display.

The above-mentioned problems can be resolved according to the constitution described below. An aspect of the present invention is an image display device comprising a pair of electrodes facing each other, provided that at least one of the electrodes is transparent, and particles existing between two substrates facing each other, the image display device is characterized in that the two aforesaid electrodes have, on the surface of the electrode facing the other electrode, a layer containing a compound of a silicone structure.

BRIEF DESCRIPTION OF THE DRAWINGS

FIGS. 2(a) and 2(b) are schematic depictions showing an example of a particle migration by application of voltage between substrates FIGS. 3(a) and 3(b) are schematic depictions showing another example of a particle migration by application of voltage between substrates FIG. 4 is a schematic depiction showing an example of configurations of the image display surface

DESCRIPTION OF THE PREFERRED EMBODIMENTS

Figure 1:
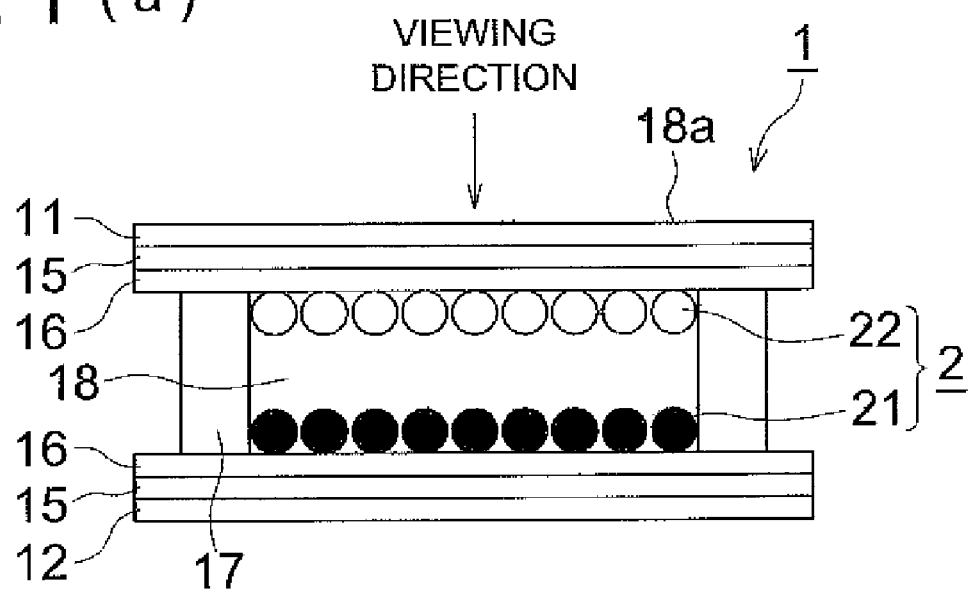
FIGS. 1(a) and 1(b) are schematic drawings showing an example of the cross-sectional constitution of an image display device
Figure 1:
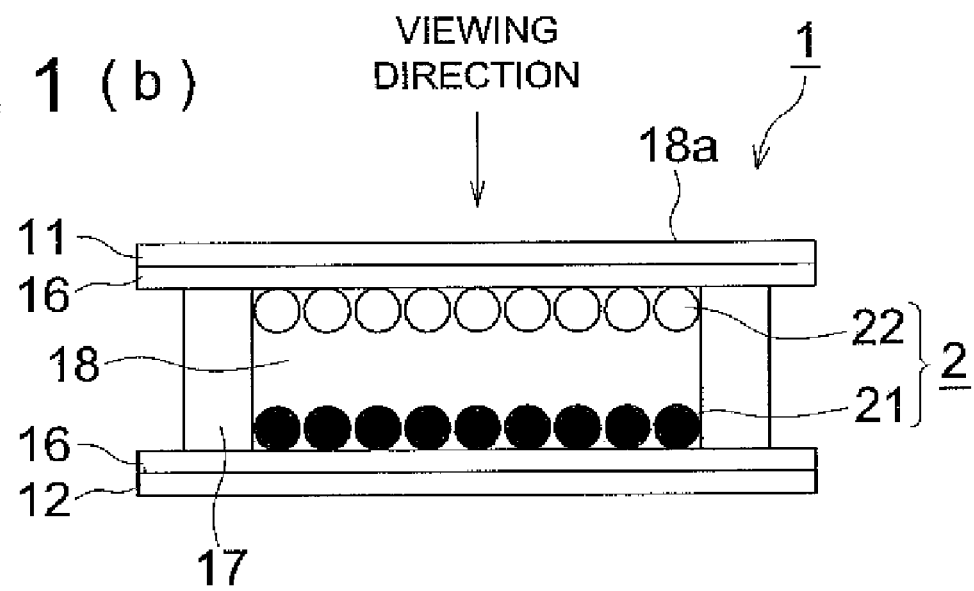

The present invention relates to an image display device wherein an image is displayed by enclosing charged particles in a gas phase, and the particles migrate by application of voltage, and in particular, relates to an image display device wherein a smooth display of images can be achieved under low applied voltage.

The inventor tried to find the so-called driving conditions of charged particles during migration of particles between substrates when voltage was applied between the substrates constituting an image display device, and paid particular attention to a fact that the particles attached themselves to the substrate surfaces which were coated with the above-described fluororesin. The inventor assumed that the attachment originated in the electronegativity of fluorine constituting the fluororesin. That is, the inventor assumed that the fluororesin itself exhibited highly negative charging characteristics due to the electronegativity of fluorine, and when particles repeatedly made contact with the fluororesin surfaces, static electricity was produced due to friction between the fluororesin and the particles, to result in generation of an attachment force due to the function of the static electricity.

It was also assumed that the plastic property of the fluororesin accelerated the attachment of particles. That is, it was assumed that as a marble attaches to clay when a marble is forced into the soft surface of clay, the soft fluororesin also tends to increase contact area with particles to result in increased attachment force.

In view of the foregoing, the inventor generated an idea that substrate surfaces were formed of a material whose properties were such that the material does not generate accumulation of static electricity which is caused by friction due to collision of particles, and in addition, does not cause an increase of contact area with particles. Based on that idea, the inventor thought to incorporate a compound of a silicone structure into the substrate surface with which the particles made contact, and then discovered that the above-mentioned problems were solved by incorporating a type of the aforesaid compound which was harder than fluororesin. That is, the inventor found that the incorporation of a compound of a silicone structure into places which made contact with migrated particles prevented particles from attaching to substrate surface, and charged particles smoothly migrate between substrates under low applied voltage.

The invention is further detailed below. The image display device of the present invention is also commonly referred to as a display element.

The image display device of the present invention comprises a pair of electrodes facing each other, provided that at least one of the electrodes is transparent, and charged particles enclosed between two substrates facing each other, and each of the two aforesaid electrodes has, on their surfaces facing each other, a layer containing a compound of a silicone structure.

The "compound of a silicone structure" of the present invention refers to organic compounds having a molecular structure exhibiting so-called siloxane bonding in which a silicon atom (Si) and an oxygen atom (O) are alternately bonded. Specific compounds having the siloxane bonding include high molecular silicones supplied in the form of rubber or resin, and low molecular silicones represented by a cyclic siloxane which is composed of a plurality of —Me$_2$SiO— units. Further, compounds of a silicone structure of the present invention include not only compounds whose molecular structures are composed only of siloxane bonding, but also compounds whose molecular structures are formed of a combination of the aforesaid siloxane bonding and another structure other than siloxane bonding. Specific compounds include compounds in a blended form in which a compound composed of a structure other than siloxane bonding and a compound of siloxane bonding are mixed (for example, a polymer blend). Other specific compounds also include compounds of a copolymer structure whose molecular structures are composed of repeated units having siloxane bonding and non-siloxane bonding. Examples of silicone resins which can be obtained on the market and can be used in the present invention are as follows: SR2406, SR2410, SR2420, SR2416, SR2405, SR2411 (made by Dow Corning Toray Silicone Co. Ltd.); and KR220, KR230, KR255, KR280, KR285, KR211 KR212, KR214, KR216 (made by Shin-Etsu Chemical Co. Ltd.)

In the present invention, when a compound of a silicone structure is added to substrate surfaces, it is preferable that the aforesaid compound is used in a combined form with a compound having a molecular structure other than a siloxane bonding, rather than the aforesaid compound which is composed only of a compound having siloxane bonding. That is, it is preferable that the aforesaid compound is, as described above, a compound having a copolymer structure composed of a combination of repeated units having a siloxane bonding and non-siloxane bonding, or compounds of a blended form in which compounds having a siloxane bonding are blended with other resins. Specifically, the preferred compounds include those which are composed of a group having a siloxane bonding in which silicon and oxygen are alternately bonded and a polymer group such as polyurethane resin and vinylpolymer resin, as well as compounds of an integrated structure by molecular bonding of constituents composing the above-described groups. It is assumed that the reason for the advantage of a combination of a molecular structure other than a siloxane bonding may be that a structure is formed such that the excessive accumulation of an electric charge on surfaces facing each other is suppressed. AS a result, it is further assumed that even if images are repeatedly displayed, since excessive electric charges do not accumulate on surfaces facing each other, mutual adhesion among particles due to electrification is avoided, enabling a stable image display.

Compounds of a silicone structure usable for the image display device of the present invention will be described in more detail later.

Next, specific embodiments of the image display device of the present invention will be described.

Firstly, representative structural cross-sections of the image display of the present invention are shown in FIGS. 1(a) and 1(b). FIG. 1(a) shows that layer-structured electrodes 15 are provided on substrates 11 and 12, and insulating layers 16 are provided on the surfaces of the electrodes 15. Alternatively, the image display device as shown in FIG. 1(b) has a structure in which no electrode is provided in the device, and is designed so that an electric field is applied through electrodes which are provided in the exterior of the device to enable particles to migrate. Image display device 1 of FIGS. 1(a) and 1(b) is, as shown in the figure, designed so that an image is viewed from substrate 11, but the present invention is not limited to a structure in which an image is viewed from substrate 11. The type of image display device as shown in FIG. 1(b) exhibits the advantage that electrode 15 is not provided in the device itself, so the structure of the device can be simplified and the manufacturing steps reduced. FIGS.

3(a) and (b) show that the type of image display device 1, as shown in FIG. 1(b), is configured to enable voltage to be applied by setting it in a device capable of applying the aforesaid voltage. The cross-sectional structure of the image display device of the present invention is not limited to those shown in FIGS. 1(a) and 1(b)

At the outermost part of image display device 1 of FIG. 1(a), there are provided two substrates 11 and 12 facing each other, which are parts of the housing constituting the aforesaid image display device. On each surface of both surfaces facing each other of substrates 11 and 12, electrode 15 is provided to apply voltage. Further, on each electrode 15, there is provided insulating layer 16, which incorporates a substance of a silicone structure.

Electrode 15 and insulating layer 16 are provided on substrates 11 and 12, and there exist particles 2 in gap 18 which is formed by the two sides facing each other incorporating electrode 15 and insulating layer 16. In image display device 1 of FIGS. 1(a) and 1(b), there exist two types of particles as particles 2 namely black particles 21 and white particles 22. Further, image display device 1 of FIGS. 1(a) and 1(b) has a structure such that gap 18 is surrounded by substrates 11 and 12 and two walls 17 on four sides, whereby particles 2 exist within gap 18 in an enclosed state.

The size of gap 18 is not limited as long as it is within a range in which the enclosed particles are capable of migration and an image contrast can be maintained, which normally is 10-500 μm, preferably 10-200 μm, and more preferably 25-75 μm. The volume occupancy of particles in gap 18 is 5-70%, preferably 10-60%, and more preferably 20-40%. By setting the volume occupancy of particles within. the above range, particles can smoothly migrate within gap 18, and an image of excellent contrast can be produced.

Next, behavior of particles 2 in gap 18 of image display device 1 will be described.

The image display device of the present invention is composed of particles existing between two substrates facing each other and at least one of the surfaces of the two substrates facing each other which incorporate a substance of a silicone structure, whereby an image display is achieved by particles 2 which are housed between the two electrodes. That is, a substance of a silicone structure is incorporated in at least one of the surfaces of two substrates constituting the image display device, and when voltage is applied between the aforesaid two substrates to form an electric field, the aforesaid particles existing between the aforesaid two substrates are electrified and migrate along the direction of the electric field. Thus, an image display is achieved by migration of charged particles between substrates via application of voltage between the substrates where particles are present.

The image display by the image display device of the present invention is achieved through the following steps:

(1) Particles used for a display medium are electrically charged via commonly known methods such as triboelectric charging using carriers;

(2) The aforesaid charged particles are enclosed between two electrodes facing each other, and voltage is applied between the aforesaid electrodes;

(3) An electric field is formed between the substrates via application of voltage to them;

(4) Being drawn, along the electric field, toward surfaces of the substrates via Coulomb attraction, the charged particles migrate, whereby an image display can be achieved; and, (5) The migration direction of the charged particles can be changed by changing the electric field direction between the substrates. The image display can be variously changed by the changes of the migration direction of the charged particles.

The above-described commonly known electrical charging methods of particles include, for example, a method in which particles are electrically charged through triboelectric charging through contact with carriers, and a method in which two types of particles differing in charging characteristic are mixed and stirred with a shaker to electrically charge the aforesaid particles through triboelectric charging among the aforesaid particles.

Examples of migration of particles 2, in response to application of voltage between substrates, are shown in FIGS. 2(a), 2(b), 3(a), and 3(b). FIG. 2(a) shows a state of particles before application of voltage between substrates 11 and 12, and positively charged white particles 22 exist near substrate 11, which is provided on the viewing side. This state indicates that image display device 1 displays a totally white image. Further, FIG. 2(b) shows a state of particles after application of voltage to electrode 15, and shows that negatively charged black particles 21 migrated near substrate 11 which is provided on the viewing side, and white particles 22 migrated to the side of substrate 12. This state indicates that image display device 1 displays a totally black image.

FIGS. 3(a) and (b) show states of particles before and after voltage being applied respectively, where a type of image display device 1 having no electrodes therein is connected to voltage application apparatus 30. In the type of image display device 1 as shown in FIG. 1(b), similarly to image display device 1 having electrodes 15, black particles 21, which are negatively charged by application of voltage, have migrated to the vicinity of substrate 11 which is provided on the viewing side, and white particles 22, which are positively charged, have migrated to the side of substrate 12.

Subsequently, there will be explained substrates 11 and 12, electrodes 15, insulating layers 16, dividing walls 17, and particles 2 (being black particles 21 and white particles 22), which constitute image display device 1 as shown in FIGS. 1(a) and 1(b).

First, substrates 11 and 12 constituting image display device 1 will be explained. With regard to image display device 1, since the observer views images formed of particles 2 from at least one side of substrates 11 and 12, a transparent material is required for the substrate which is provided on the viewing side. Therefore, the substrate used on the side from which the observer views images is, for example, preferably composed of a light transparent material exhibiting visual light transmittance of not less than 80%. An observer can clearly view images through a substrate exhibiting a visual light transmittance of not less than 80%. Of substrates constituting image display device 1, the substrate which is provided on the opposite side of the image viewing side need not necessarily be composed of a transparent material.

The thickness of substrates 11 and 12 is preferably of 2 μm-5 mm, more preferably of 5 μm-2 mm, and still more preferably 30-200 μm. A thickness of substrates 11 and 12 within the above range provides image display device 1 sufficient rigidity, as well as enabling and maintaining uniform spacing between the two substrates. Further, since a thickness of the substrates within the above range provides a compact size and low weight image display device, usage of the aforesaid image display device in a wide variety fields is promoted. Further, by setting the thickness of the substrate on the image viewing side to be within the above range, correct viewing of displayed images can be achieved, to result in no hindrance of display quality.

Materials exhibiting visual light transmittance of not less than 80% include nonflexible inorganic materials such as glass and quartz, organic materials represented by resin materials, which will be described later, and metal sheets. Of these, organic materials and metal sheets may provide the image display device a certain degree of flexibility. Resin materials capable of exhibiting visual light transmittance of not less than 80% include, for example, polyester resins represented by polyethylene terephthalate or polyethylene naphthalate, polycarbonate resins, polyether sulphone resins, and polyimide resins. In addition, other examples include transparent resins provided by radical polymerization of polymerizable vinyl monomers such as acrylic resins and polyethylene resins, which are polymers of acrylic esters or methacrylate esters, represented by polymethylmethacrylate (PMMA).

Next, electrodes 15 constituting image display device 1 will be explained. Electrodes 15, which are provided on one surface of substrates 11 and 12, form an electric field by application of voltage between the electrodes, that is, within gap 18. Similarly to the above-mentioned substrates, transparent electrodes 15 are required to be provided on the side from which the observer views the image.

The thickness of the electrode which is provided on the image viewing side is required to be of such a level that visual light transparency is not hindered, and at the same time, electrical conductivity is ensured. Specifically, the aforesaid thickness is preferably 3 nm-1 µm, more preferably 5-400 nm. Visual light transmittance of the electrode which is provided on the image viewing side is, similarly to the aforesaid substrate, preferably not less than 80%.

It is preferable that the thickness of the electrode which is provided on the opposite side of the image viewing side is also within the above-described range, but that electrode is not required to be transparent.

Materials constituting electrodes 15 include metal materials, electroconductive metal oxides, and electroconductive polymer materials. Specific metal materials include, for example, aluminum, silver, nickel, copper, and gold. Specific electroconductive metal oxides include indium tin oxides (ITO), indium oxide, antimony tin oxides (ATO), tin oxide, and zinc oxide. Examples of electroconductive polymer materials include polyaniline, polypyrrole, polythiophene, and polyacetylene.

Methods of forming electrodes 15 on substrates 11 and 12 include, in the case of forming a thin film electrode, for example, a spattering method, a vacuum deposition method, a chemical vapor deposition method (the CDV method), and a coating method. Further included is a method in which an electroconductive material is mixed with a solvent or binder resin, and the resulting mixture is coated on a substrate to form the electrode.

Next, insulating layers 16 constituting image display device 1 will be explained.

As shown in FIGS. 1(a) and 1(b), image display device 1 of the present invention has a structure such that insulating layer 16, incorporating a substance of a silicone structure, is provided on one surface of electrode 15, and particles 21 and 22 make contact with the surface of insulating layer 16. The substance of a silicone structure and being incorporated in insulating layer 16 is represented by silicone resins. Such silicone resin is a generic term of polymer compounds whose basic skeleton is a bonding of a silicon atom (Si) and an oxygen atom (O), which is referred to as siloxane bonding, and having groups such as an alkyl group at their side chains, and is also referred to as an organic silicon compound.

Methods to incorporate the silicone resin in insulating layer 16 are described next. In the case of forming insulating layer 16 on the surface of electrode 15 as shown in FIGS. 1(a) and 1(b), the silicone resin can be incorporated in insulating layer 16 by selecting a silicone resin as a resin component used for insulating layer formation, and then boating the aforesaid silicone resin onto the electrode. In the case where electrode 15 has such a structure that electroconductive particulates are dispersed in a binding resin, the silicone resin can be incorporated in the surface of electrode 15 by employing a silicone resin as a component constituting a binding resin. In the case of a method in which an electric field is provided from the exterior of image display device 1, since surfaces of substrates 11 and 12 become surfaces with which particles 21 and 22 make direct contact, the silicone resin can be incorporated in insulating layer 16 by providing insulating layer 16, incorporating silicone resins, on the opposing surfaces of substrates 11 and 12, or by employing the silicone resin as a component constituting substrates 11 and 12.

In the case of incorporating a silicone resin in insulating layer 16 arranged on the surface of electrode 15, the amount of the silicone resin to be incorporated is preferably not less than 10 ppm. In the case where electrode 15, having such a structure that electroconductive particulates are dispersed in a binding resin, is employed, the silicone resin is preferably incorporated in the binding resin in an amount of not less than 10 ppm. In the case where insulating layer 16 is directly provided on the opposing surfaces of substrates 11 and 12, or the silicone resin is incorporated in substrates 11 and 12 as a component constituting thereof, the silicone resin is preferably incorporated in insulating layer 16 or substrates 11 and 12 in an amount of not less than 10 ppm.

The methods of adding a silicone resin, in both cases where the silicone resin is incorporated in substrates 11 and 12 as a component constituting thereof, and where electrode 15 is employed having such a structure that electroconductive particulates are dispersed in the binding resins, include, for example, a method in which a silicone resin is dissolved in a solvent, and the resulting solution is coated and then dried; a method in which a curable raw material is coated followed by being cured by heat or ultraviolet rays; and a method in which, during the production of substrates 11 and 12 or electrodes 15, a silicone resin or a raw material thereof is added to materials for forming substrates 11 and 12 or electrode 15, or the silicone resin or the raw material thereof is coated.

The thickness of insulating layer 16 is preferably not less than 0.01 µm and not more than 10.0 µm. That is, in the case of the thickness of insulating layer 16 being within the above range, particles 21 and 22 can migrate without high application of voltage between the two electrodes 15, and then it is preferable that, for example, image formation can be carried out at the voltage level being applied for an image formation by an electrophoretic method.

Next, specific examples of silicone resins usable for the present invention will be explained. The silicone resins, usable for the present invention, are composed of repeating units or formula $RnSiO_{(4-n)}$ represented by polysiloxane resins. That is, the basic skeleton of the formula is constituted by repeating units composed of a bonding of a silicon atom (Si) and an oxygen atom (O), which is referred to as siloxane bonding, and the formula has organic groups such as a methyl group and a phenyl group in its side chains. Polysiloxane resins may be provided via polymerization of hydrolyzed monomers of organochlorosilanes, and have such a structure, as shown in the following Chemical Structure 1. In the structure, "n" pieces of organic groups (R's), which become side chains, are bound to silicon atoms constituting the main chain.

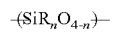 (Chemical Structure 1)

The silicone resins usable for the present invention include, in addition to the above-described polysiloxane resins, resins which are referred to as modified silicone resins. The term "modified silicone resins" indicates resins in which other organic polymer resin components such as acrylic resins are incorporated in polysiloxane resin components constituting the aforesaid silicone resins. Specific examples of modified silicone resins include those resins which are provided in the form of a copolymerized resin having a structure in which an organic polymer chain is molecularly bonded to a polysiloxane polymer chain constituted of siloxane bonding, and resins which are provided in the form of a blended resin in which organic polymer resin is mixed with polysiloxane resin.

The modified silicone resins are referred to, for example, as alkyd modified silicone resin, and as polyester modified silicone resin, based on types of molecularly bonded organic polymers. Specific examples of modified silicone resins usable for the present invention include, for example, alkyd modified silicone resin, polyester modified silicone resin, acryl modified silicone resin, epoxy modified silicone resin, and phenol modified silicone resin.

In the present invention, it is possible that the above-described silicone resins are employed individually or as a mixture of a plurality thereof. The molecular weight of the silicone resins employed is not particularly limited, and silicone resins from relatively low molecular weight, which are referred to as so-called silicone oil, to high molecular weight are usable.

Next, dividing walls 17 constituting image display device 1 will be explained. In image display 1, as shown in FIGS. 1(a) and 1(b), gap 18, corresponding to a space between the two substrates of the present invention, is formed by opposing substrates 11 and 12, but, if needed, gap 18 may be formed by providing two dividing walls 17 in such a manner that two dividing walls 17 are arranged at right angles to each of the two substrates 11 and 12. Employing two dividing walls 17 together with substrates 11 and 12 in the above-described way can form gap 18 whose four sides are surrounded by the substrates and the dividing walls. Due to the formation of image display device 1 by employing dividing walls 17, it is possible to allow image display surface 18a, which is provided when gap 18 is viewed from the viewing direction of substrate 18, to exhibit various patterns as shown in FIG. 4.

FIG. 4 is a schematic depiction showing examples of patterns of image display surface 18a. As shown in FIG. 4, image display surface 18a can show, based on arrangement of dividing wall 17, various patterns such as square type, triangular type, line type, circular type, and hexagonal type, and in addition, by combining a plurality of the aforesaid patterns, image display surfaces having patterns such as a honeycomb type, and a reticulate type can be formed. Individual of gaps 18, which are separated by dividing walls 17, may also be called a cell. It is desirable to make the width of dividing wall 17, that is, a thickness of the part of the dividing wall adjacent to image display surface 18a, as thin as possible to ensure clearness of displayed images.

Dividing walls 17 can be formed by a processing treatment on the substrate surface which is opposite image viewing substrate 11, by employing, for example, any of the following methods, which include, for example, embossing using resin materials, formation of concave-convex surfaces by hot-press injection molding, photolithography, and screen printing.

Next, particles 2, which are enclosed within gap 18, will be explained. Two types of particles, namely white particles 22 and black particles 21 are enclosed in the image display device shown in FIGS. 1(a) and 1(b). Image display is achieved in such a manner that when voltage is applied to electrodes 15 which are provided on substrates 11 and 12, an electric field is formed within gap 18, due to which white particles 22 and black particles 21 are electrically charged by the triboelectric charging to migrate within gap 18 in response to the electric field. Thus, image display is achieved via migration of particles within gap 18 wherein an electric field has been formed. Images exhibiting contrast are provided by the image formation employing white particles 22 and black particles 21.

Methods of providing electric field (application of voltage) within gap 18 to drive particles 2 incorporated in gap 18 include, for example, but are not particularly limited to, a method, performed in image display device 1 as shown in FIG. 1(a), in which an electric field is provided within gap 18 through electrode 15 being arranged on substrates 11 and 12. On the other hand, image display device 1 as shown in FIG. 1(b) has no electrode 15 in its structure. In such a type of image display device, as described above, an electric field is formed within gap 18 by connecting image display device 1 to an apparatus having its electrodes which is outside of image display device 1 to achieve driving of particles 2.

When images are displayed with two types of colored particles, namely white particles 22 and black particles 21, migration of the two types of particles can be controlled by providing white particles 22 and black particles 21 with differing electrical characteristics via commonly known methods. Specific examples of the aforesaid methods include, for example, a method to design particles so as to change their relative position in the triboelectric series compared to carriers, and a method to select an external additives, which are added to surfaces of particles, so that the aforesaid particles may change the relative position in the triboelectric series compared to carriers.

The particle size of particles 2 which is usable for image display device 1 is preferably 0.1-50 μm with respect to the volume-based median diameter. Setting the particle size of particles 2 within the above range provides uniform and clear images. Further, since there is no need to be concerned that the above particles cause mutual coagulation, the particles can migrate smoothly and provide images exhibiting moderate image density and contrast.

The volume-based median diameter ($D50_v$) of particles 2 is measured and calculated via an apparatus, such as Multisizer III (manufactured by Beckman Coulter Inc.) connected with a computer system for data processing.

The aforesaid measurement is carried out as follows: 0.02 g of particles 2 is soaked in 20 ml of a surface active agent solution, which is employed to disperse particles 2 and is prepared, for example, by diluting a neutral detergent containing a component of surface active agent by a factor of 10 in pure water, and the resulting mixture is subjected to ultrasonic dispersion for one minute to prepare the particle dispersion. The particle dispersion is then charged using a pipette into a beaker containing ISOTON II (produced by Beckman Coulter Inc.), placed on a sample stand, to achieve a measured concentration of 10%, followed by measurement with the count of the measuring apparatus set to 2,500. The aperture diameter of Multisizer III is set to 50 μm.

Next, materials constituting particles 2 which are enclosed within gap 18, formed of substrates 11 and 12, will now be explained. Particles 2, employed in image display device 1, contain at least a resin and a coloring agent, and are required to display electrical characteristics by an action such as frictional force. Since particles 2 are required to display images exhibiting sufficient contrast in image display device 1, particles 2 are preferably colored by a coloring agent. Further, inorganic compound particles such as titanium oxide, or calcium carbonate may be externally added onto the surface of particles 2.

Resins constituting particles 2 are represented by, but are not particularly limited to, a polymer which is referred to as vinyl resins, which is detailed below. In addition to the vinyl resins, the aforesaid resins also include condensation resins such as polyamide resins, polyester resins, polycarbonate resins, and epoxy resins. Specific examples of the vinyl resins include polystyrene resins, polyacrylic resins, polymethacrylic resins, and further include polyolefin resin which is formed of ethylene monomer or propylene monomer. Resins other than vinyl resins include, in addition to the above-described condensation resins, polyether resins, polysulfone resins, polyurethane resins, fluorine resins, and silicone resins.

The polymers constituting resins usable for particles 2 may be produced by employing at least one type of polymerizable monomer, and, in addition, may be produced in combination of plural types of polymerizable monomers. Production methods, in combination of plural types of polymerizable monomers, include, for example, a method of forming copolymers such as a block copolymer, a graft copolymer, and a random copolymer, and also include a method of forming resins via a polymer blending method in which plural types of resins are blended.

Next, the coloring agent used for particles 2 is also not particularly limited, and commonly known pigments are usable. Of these, white pigments constituting white particles 21 include, for example, zinc oxide (zinc white), titanium oxide, antimony white, and zinc sulfide, of which titanium oxide is preferred Black pigments constituting black particles 22 include, for example, carbon black, copper oxide, manganese dioxide, aniline black, and activated carbon, of which carbon black is preferred.

The production methods of particles 2 are not particularly limited, and particles 2 can be produced by application of commonly known methods for production of particles incorporating a resin and a coloring agent. Commonly known methods include, for example, a method of a toner employed for electrophotographic image formation Specific production methods of particles 2 include, for example, the following:

(1) A method in which a resin and a coloring agent are kneaded to form a mixture, which mixture is then subjected to the steps of pulverization and classification to produce the targeted particles.
(2) A so-called suspension polymerization method, in which a polymerizable monomer and a coloring agent are mechanically agitated in a water-based medium to form droplets, which are then subjected to polymerization to produce the targeted particles.
(3) A so-called emulsion coagulation method, in which a polymerizable monomer is dropped into a water-based medium containing a surface active agent, which is then polymerized in micelles to produce the targeted polymerized particles of 100-150 nm, and after which, coloring agent particles and an aggregating agent are added to the aforesaid polymerized particles followed by coalescing the aforesaid polymerized particles and the aforesaid coloring agent particles.

EXAMPLES

The embodiments of this invention will now be described with reference to examples, but the invention is by no means limited to them.

1 Manufacturing of an Image Display Device

An image display device to display images by employing white particles exhibiting negative charging characteristics and black particles exhibiting positive charging characteristics was manufactured through the steps described below.

1-1. Production of Particles (1) Production of "White Particle 1"

The resin and a titanium oxide described below are introduced into a Henschel mixer (manufactured by Mitsui Miike Machinery Co., Ltd.), and was subjected to a blending treatment over 5 minutes at a circumferential speed of the mixing blades being set to 25 m/second to produce a mixture.

| | |
|---|---|
| styrene acrylic resin (at weight average molecular weight of 20,000) | 100 parts by weight |
| anatase-type titanium oxide (at number-average primary particle size of 150 nm) | 30 parts by weight |

The above mixture was kneaded via a biaxial extrusion kneading machine, after which the kneaded mixture was pulverized via a turbo-mill pulverizer (manufactured by Turbo Kogyo Co., Ltd.) after initially being coarsely pulverized. After that, the resulting fine particles were subjected to classification treatment via an air classifying machine utilizing the Coanda effect, to produce white particles with a volume-based median diameter of 8.2 μm.

Subsequently, to the above white particles added were fine silica particles (at a number-average primary particle size of 50 nm), in an amount of 0.6 part by weight, which were treated with an aminosilane coupling agent, followed by a treatment with a hybridizer (manufactured by Nara Machinery Co., Ltd.) at a rotation rate of 15,000 rpm for 10 minutes. Further, added were silica particles with a number-average primary particle size of 15 nm, in an amount of 1.0 part by weight, which were treated with an aminosilane coupling agent, followed by a treatment similar to the above treatment, to produce "White Particle 1".

(2) Production of "Black Particle 1"

The resin and a carbon black described below are introduced into a Henschel mixer (manufactured by Mitsui Miike Machinery Co., Ltd.), and were blended over 5 minutes at a circumferential speed of the mixing blades being set to 25 m/second to produce a mixture.

| | |
|---|---|
| styrene acrylic resin (at weight average molecular weight of 20,000) | 100 parts by weight |
| carbon black (at number-average primary particle size of 25 nm) | 10 parts by weight |

The above mixture was kneaded via a biaxial extrusion kneading machine, and then the kneaded mixture was pulverized via a turbo-mill pulverizer (manufactured by Turbo Kogyo Co., Ltd.), after initially being coarsely pulverized. After that, the resulting fine particles were subjected to classification treatment via an air classifying machine utilizing the Coanda effect, to produce black particles with a volume-based median diameter of 8.0 μm Subsequently, to the above black particles added were fine silica particles (at a number-average primary particle size of 50 nm), in an amount of 0.6 part by weight, which were treated with an aminosilane coupling agent, followed by a treatment with a hybridizer (manufactured by Nara Machinery Co., Ltd.) at a rotation rate of 15,000 rpm for 10 minutes. Further, added were silica particles with a number-average primary particle size of 15 nm, in an amount of 1.0 part by weight, which were treated with an aminosilane coupling agent, followed by a treatment similar to the above treatment, to produce "Black Particle 1".

1-2. Formation of an Insulating Layer

Two glass substrates of 80 mm in length, 50 mm in width, and 0.7 mm in thickness were prepared, and an electrode composed of indium tin oxide (ITO) layer of 300 nm in thickness was formed via a vapor-deposition technique on each surface of the aforesaid substrate. An application liquid, in which 12 g of polycarbonate resin, at a viscosity average molecular weight of 30,000 and having the structure described below (Chemical Structure 2, Iupilon Z300, made by Mitsubishi Gas Chemical Co., Inc.), were dissolved in a mixed solvent of 80 ml of tetrahydrofuran and 20 ml of toluene, was coated by a spin coat method onto the glass substrate on which the above-described electrode was formed, to form the targeted insulating layer. The insulating layer was formed by the coating to a dried film thickness of 3 μm. The above application liquid was prepared so that dimethylsilicone resin (KF96, made by Shin-Etsu Chemical Co., Ltd.) at a viscosity average molecular weight of 100,000 was incorporated therein at 100 ppm concentration.

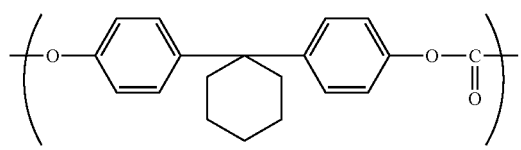

(Chemical Structure 2)

1-3. Manufacturing of "Image Display Device 1"

Each of "White Particle 1" and "Black Particle 1" was stirred with a shaker for 30 minutes, to be positively and negatively charged respectively, in advance, through triboelectric charging.

A gap was formed in such a manner that the two above-described glass substrates, having an insulating layer composed of a polycarbonate resin and a dimethylsilicone resin, were arranged so that the insulating layers faced each other, and two 50 μm boards of polyethylene terephthalate serving as dividing walls were sandwiched between two ends of the aforesaid glass substrates. A mixture comprised of "White Particles 1" and "Black Particles 1" was made to fill the aforesaid gap to each occupied volume of white particles and black particles of 15%, to manufacture "Image Display Device 1".

1-4. Manufacturing of "Image Display Devices 2 and 3"

"Image Display Device 2" was manufactured in a similar manner to the manufacturing of the aforesaid "Image Display Device 1" except that, at the formation step of an insulating layer on the glass substrate employed for the manufacturing of the aforesaid "image Display Device 1", the content of dimethylsilicone exhibiting a viscosity average molecular weight of 100,000 was changed from 100 ppm to 1,000 ppm. Further, "Image Display Device 3" was manufactured in a similar manner to the manufacturing of the aforesaid "Image Display Device 1" except that the content of dimethylsilicone was changed from 100 ppm to 10,000 ppm.

1-5. Manufacturing of "Image Display Device 4"

"Image Display Device 4" was manufactured in a similar manner to the manufacturing of the aforesaid "Image Display Device 1" except that, at the formation step of an insulating layer on the glass substrate employed for the manufacturing of the aforesaid "Image Display Device 1", a silicone modified polycarbonate resin, at a viscosity average molecular weight of 40,000, and having the structure to be described below (Chemical Structure 3), was employed, and no dimethylsilicone resin was added into the application liquid.

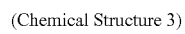

(Chemical Structure 3)

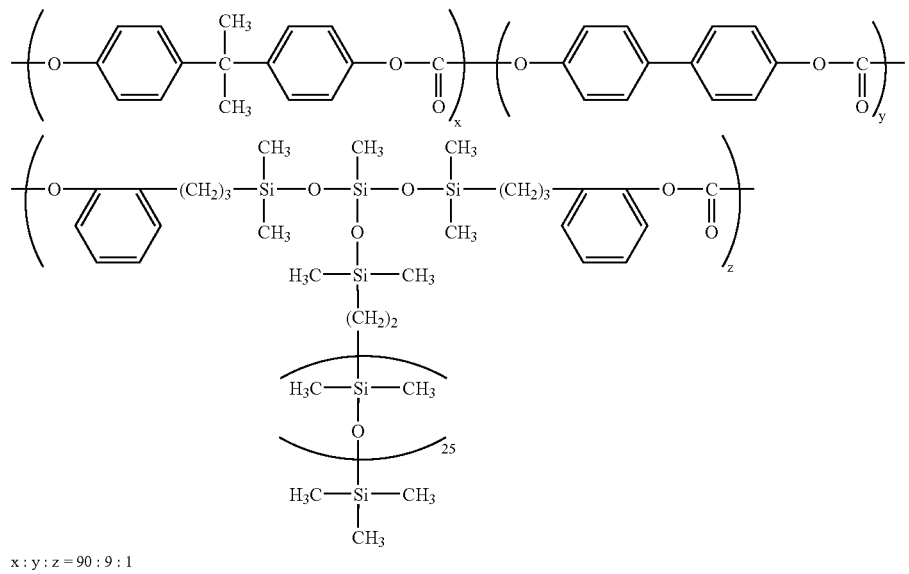

1-6. Manufacturing of "Image Display Device 5"

"Image Display Device 5" was manufactured in a similar manner to the manufacturing of the aforesaid "Image Display Device 1" except that, at the formation step of an insulating layer on the glass substrate employed for the manufacturing of the aforesaid "Image Display Device 1", a silicone-urethane copolymer resin at a viscosity average molecular weight of 35,500 (Rezamin PS-40000, made by Dainichiseika Color & Chemicals Mfg. Co., Ltd.), which was produced via the steps below, was employed, and no dimethylsilicone resin was added into the application liquid. The production steps of the aforesaid silicone-urethane copolymer resin are described below.

The following compounds were charged into a reaction vessel equipped with a mixers a temperature sensor, a cooling tube and a nitrogen-introducing tube. The resulting mixture was subjected to reaction treatment at 180° C. for 10 hours in a nitrogen gas stream, to produce polysiloxane-polyester copolymer exhibiting a hydroxyl value of 37, an acid value of 0.40, and a molecular weight of 3,030.

| | |
|---|---|
| ε-caprolactone | 310 parts by weight |
| alcohol modified siloxane oil having a structure below (Chemical Structure 4) | 150 parts by weight |

(Chemical Structure 4)

$$HOC_2H_4O(CH_2)_3Si(OSi)_kC_3H_6OC_2H_4OH$$
with $H_3C$ $CH_3$ substituents ("k" is the value to achieve a molecular weight of 980)
tetrabutyl titanate 0.05 part by weight
("k" is the value to achieve a molecular weight of 980)
tetrabutyl titanate   0.05 part by weight Subsequently, the compounds below were mixed and dissolved, to produce mixed compounds comprising the compounds described below.

| | |
|---|---|
| the above-described polysiloxane-polyester copolymer | 150 parts by weight |
| 1,4-butanediol | 27 parts by weight |
| Methyl ethyl ketone | 200 parts by weight |
| dimethylformamide | 100 parts by weight |

A mixture solution comprised of the compounds below was gradually dropped into the aforesaid mixed compounds under stirring at 60° C.

| | |
|---|---|
| hydrogenated MDI (hydrogenated 4,4'-diphenylmethane diisocyanate) | 91 parts by weight |
| dimethylformamide | 188 parts by weight |

After completion of the dropping, a reaction treatment was carried out at 80° C. for 6 hours, to produce a silicone-urethane copolymer resin. Viscosity average molecular weight of the produced resin was determined at 25° C. to be 35,000, with the solid concentration of the resin being adjusted to 35%. The thus regulated resin solution exhibited high transparency.

1-7. Manufacturing of "Image Display Device 6"

"Image Display Device 6" was manufactured in a similar manner to the manufacturing of the aforesaid "Image Display Device 1" except that, at the step of forming the insulating layer on the glass substrate employed for the manufacturing of the aforesaid "Image Display Device 1", the aforesaid application liquid containing no dimethylsilicone resin exhibiting a viscosity average molecular weight of 100,000, was employed.

1-8. manufacturing of "Image Display Device 7"

"Image Display Device 7" was manufactured in a similar manner to the manufacturing of the aforesaid "Image Display Device 1" except that, at the step of forming the insulating layer on the glass substrate employed for the manufacturing of the aforesaid "Image Display Device 1", a terpolymer resin of tetrafluoroethylene, hexafluoropropylene and vinylidene-fluoride at a viscosity average molecular weight of 50,000 (Dyneon THV220A, made by Sumitomo 3M Ltd), and having the structure described below (Chemical Structure 5), was employed, and no dimethylsilicone resin was added to the application liquid.

(Chemical Structure 5)

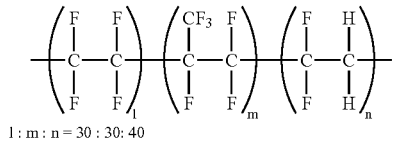

l : m : n = 30 : 30 : 40

1-9. Manufacturing of "Image Display Devices 8 and 9"

In the manufacturing of the aforesaid "Image Display Device 1", no electrode having a thin film of indium tin oxides (ITO) on a glass surface was formed, and instead, the application liquid, to form the aforesaid insulating layer, was coated onto the surfaces of glass substrates to a dry coated film thickness of 3 μm, to manufacture "Image Display Device 8". That is, "Image Display Device 8" has insulating layers on two glass substrates, having no electrode, whereby the aforesaid insulating layer incorporates dimethylsilicone resin at a viscosity average molecular weight of 100,000 at 100 ppm.

In the manufacturing of the aforesaid "Image Display Device 6", no electrode having a thin film of indium tin oxides (ITO) on a glass surface was formed, and instead, the application liquid, to form the aforesaid insulating layer, was coated onto the surface of glass substrates to a dry coated film thickness of 3 μm, to manufacture "Image Display Device 9" having no electrodes Thus "Image Display Devices 1-9" were manufactured via the above steps.

2. Experiments for Evaluations

"Image Display Devices 1-5 and 8" and "Image Display Devices 6, 7, and 9", which were manufactured via the above-described steps, were designated as "Examples 1-6" and "Comparative Examples 1-3", respectively.

Display characteristics of each type of image display device were evaluated in such steps that direct-current voltage was applied to them via the following steps, and reflection density of each image display device, which density was provided by the applied voltage, was determined. The application of voltage was carried out via the steps described below so that hysteresis loops would be drawn exhibiting paths such that applied voltage was varied from 0 V to the positive voltage region, followed by dropping into the negative voltage region, and after that, applied voltage was returned again to 0 V. That is;

(1) application of voltage by varying voltage from 0 V to +100 V at intervals of 20 V;

(2) application of voltage by varying voltage from +100 V to −100 V at intervals of 20 V; and
(3) application of voltage by varying voltage from −100 V to 0 V at intervals of 20 V.

However, the application of voltage to "Image Display Devices 6, 7, and 9 (namely Comparative Examples 1-3)" was carried out from 0 V to +250 V at intervals of 50 V at the above step (1), +250 V to −250 V at intervals of 50 V at the above step (2), and from −250 V to 0 V at intervals of 50 V at the above step (3).

"Image Display Devices 1-5" and "Image Display Devices 6 and 7" had direct-current voltage applied employing two electrodes, which were integrated in the image display device, and featuring a thin film of indium tin oxides (ITO). "Image Display Devices 8 and 9" were connected to a measurement apparatus equipped with electrodes, and direct-current voltage was applied from electrodes which were provided by the measurement apparatus. More specifically, each of Image Display Devices 8 and 9 was placed between a pair of aluminum electrodes in parallel to the electrodes. The gap between the electrodes was set to be 2 mm, and the distances between the electrode and glass substrates of each of Image Display Devices 8 and 9 were set equal. A direct-current voltage was applied to the two aluminum electrodes from an external electric source to produce electric field in the Image Display Devices so as to make the display.

The applied voltages for Image Display Devices 8 and 9 were obtained from the converted applied voltage shown below.

$$\text{Converted applied voltage} = \left(\frac{\text{distance between two insulating layer in Image Display Device}}{\text{distance between the two external electrodes}}\right) \times$$
(applied external voltage)
$$= (50\ \mu m/2\ mm) \times$$
(applied external voltage)
$$= 0.025 \times \text{(applied external voltage)}$$

When direct-current voltage was applied to each image display device as in the above-described steps, it was confirmed that the display changed from white to black following application of positive voltage at a state of white display.

Evaluation was conducted for display characteristics such as black density, white density, and contrast, and also of minimum driving voltage, where "black density" refers to reflection density on the display surface which is provided when voltage of +100 V is applied to the electrode located on the viewing side of the image display device, and "white density" refers to reflection density on the display surface which is provided when voltage of −100 V is applied via the above-described hysteresis loops. However, the black density of each of the comparative examples 1-3 is the reflection density which is provided when a voltage of +250 V is applied to the image display device.

Contrast is defined by the difference between black density produced at the above step (1) and white density produced at the above step (2). That is, it is defined by equation:

Contrast=[black density provided at step (1)]−[white density provided at step (2)]

"Minimum driving voltage" refers to the voltage which produces the display density stated below, when the voltage is varied from 0 V to +100 V at intervals of 20 V (except with regard to comparative examples 1-3, when voltage is varied from 0 V to +250 V at intervals of 50 V).

Display density=[white density produced at step (2)]+ [{black density produced at step (1)−(white density produced at step (2)}×0.1]

Each above-mentioned density is an average density of 5 densities randomly measured at 5 points on the display surface via a reflection densitometer RD-918 (manufactured by Macbeth Co.) A white density of not more than 0.55, a black density of not less than 1.25, and a contrast of not less than 0.70, were evaluated as acceptable. With regard to minimum driving voltage, not more than 50 V was evaluated as acceptable.

The above results are shown in following Table 1.

TABLE 1

| | Display Device No. | Silicone Addition Method | | Display Characteristics | | | Minimum Driving Voltage (V) |
| --- | --- | --- | --- | --- | --- | --- | --- |
| | | As a Blend | As a Copolymer | White Density | Black Density | Contrast | |
| Example 1 | 1 | Y | N | 0.52 | 1.27 | 0.74 | 50 |
| Example 2 | 2 | Y | N | 0.50 | 1.32 | 0.82 | 30 |
| Example 3 | 3 | Y | N | 0.48 | 1.36 | 0.88 | 25 |
| Example 4 | 4 | N | Y | 0.48 | 1.42 | 0.94 | 30 |
| Example 5 | 5 | N | Y | 0.49 | 1.36 | 0.87 | 40 |
| Example 6 | 8 | Y | N | 0.51 | 1.28 | 0.77 | 44 |
| Comp. 1 | 6 | N | N | 0.60 | 1.20 | 0.60 | 100 |
| Comp. 2 | 7 | N | N | 0.70 | 1.10 | 0.40 | 100 |
| Comp. 3 | 9 | N | N | 0.62 | 1.18 | 0.56 | 100 |

Comp.: Comparative Example

As shown in Table 1, each image display device of Example 1-6 of the present invention has minimum driving voltage of not more than 50 V, and exhibits values of display characteristics such that black density is not less than 1.25, white density is not more than 0.50, and contrast is not less than 0.70, to result in reaching targeted standards prescribed for the present invention. On the other hand, each image display device of Comparative Example 1-3, which is outside the scope of the present invention, had a minimum driving voltage of 100 V, and none of the examples displayed characteristics of reaching the targeted standards prescribed for the present invention.

Thus, Examples 1-6 showed better image display characteristics than Comparative Examples 1-3 under application of lower voltage. Further, with regard to minimum driving voltage, Examples 1-6 had lower voltage than Comparative Examples 1-3. From the above results, it was confirmed that the constitutions of the present invention enabled particles to smoothly migrate under lower applied voltage, to result in stable image display.

What is claimed is:

1. An image display device comprising:
   (i) a pair of substrates facing each other, provided that one of the substrates is transparent;
   (ii) charged particles placed in a gap between the substrates;
   a means for providing an electric field in the gap,
   wherein each of the substrates has a layer containing a compound having a silicone structure in the molecule on a surface of the substrates facing each other;
   the compound is contained in at least one of the following states:
   a copolymer composed of the compound having the silicone structure in the molecule and a repeated unit having non-siloxane bonding; and
   a polymer blend composed of the compound having the silicone structure in the molecule mixed with a resin containing no siloxane bonding.

2. The image display device of claim 1, wherein the gap between the substrates has a distance of from 10 to 500 µm.

3. The image display device of claim 1, wherein a volume occupancy of the charged particles in the gap between the substrates is from 5 to 70% based on the total volume of the gap.

4. The image display device of claim 1, wherein each of the substrates has a thickness of 2 µm to 5 mm.

5. The image display device of claim 1, wherein the means for providing the electric field is
   a pair of electrodes, each provided between the substrate and the layer containing the compound having the silicone structure in the molecule,
   and the layer containing the compound having the silicone structure in the molecule is an insulating layer.

6. The image display device of claim 1, wherein the electrode through which an image is observed has a thickness of 3 nm to 1 µm.

7. The image display device of claim 1, wherein the compound having the silicone structure in the molecule is a silicone resin.

8. The image display device of claim 7, further comprising a modified silicone resin.

9. The image display device of claim 8, the modified silicone resin is selected from the group consisting of an alkyd modified silicone resin, a polyester modified silicone resin, an acryl modified silicone resin, an epoxy modified silicone resin and a phenol modified silicone resin.

10. The image display device of claim 1, wherein the repeated unit in the copolymer is a urethane group, a vinyl group or a carbonate group; and
    the resin in the polymer blend is a polyurethane resin, a polyvinyl resin or a polycarbonate resin.

11. The image display device of claim 1, wherein
    the copolymer is a silicone-carbonate copolymer; and
    the resin in the polymer blend is a polycarbonate resin.

* * * * *